Aug. 4, 1942.   J. F. JOY   2,291,633
MINING MACHINE
Original Filed May 20, 1937   10 Sheets-Sheet 1

Inventor:
Joseph F. Joy.
by
Amis A. Maxam.
Attorney

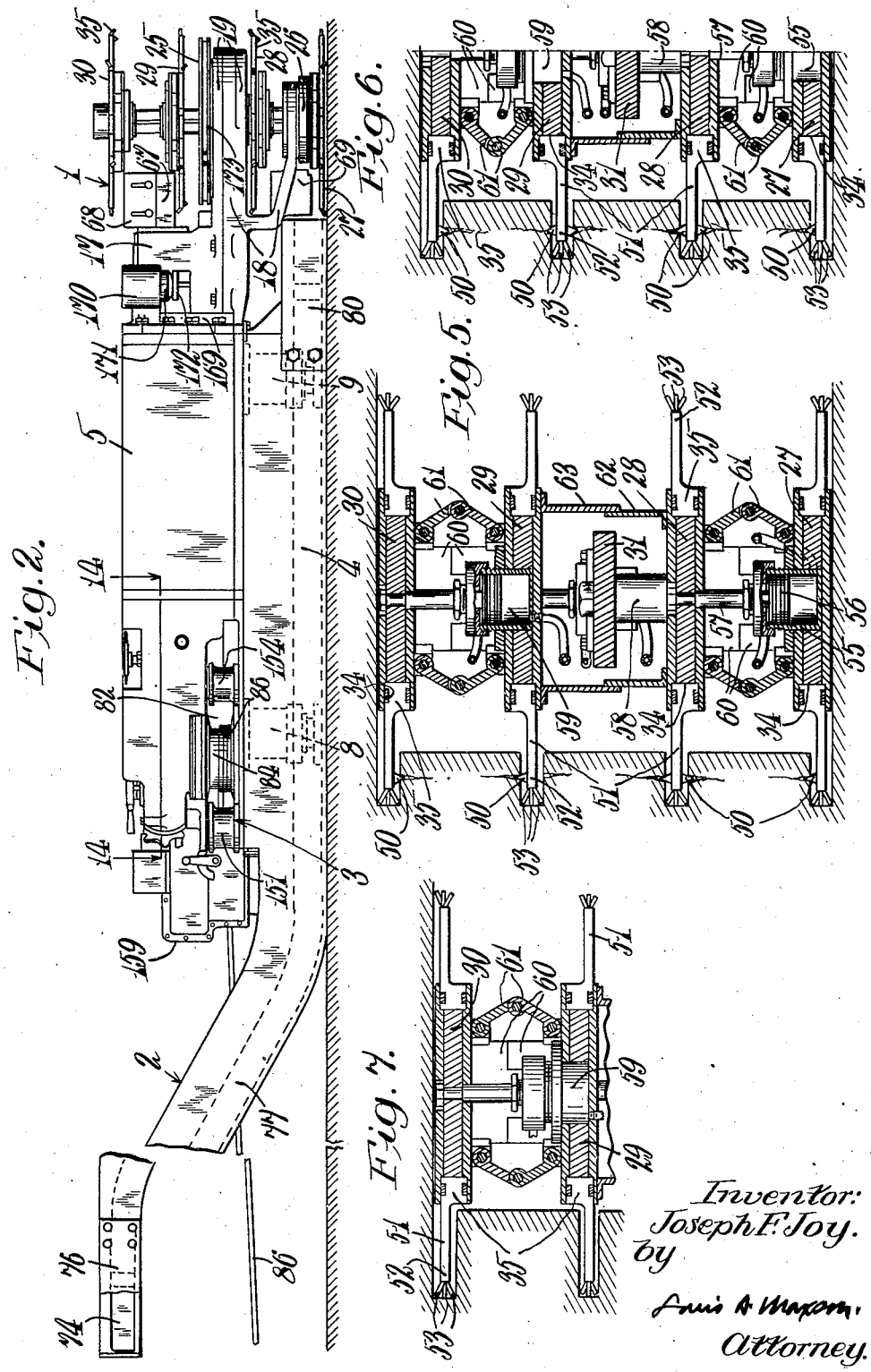

Aug. 4, 1942.   J. F. JOY   2,291,633
MINING MACHINE
Original Filed May 20, 1937   10 Sheets-Sheet 3
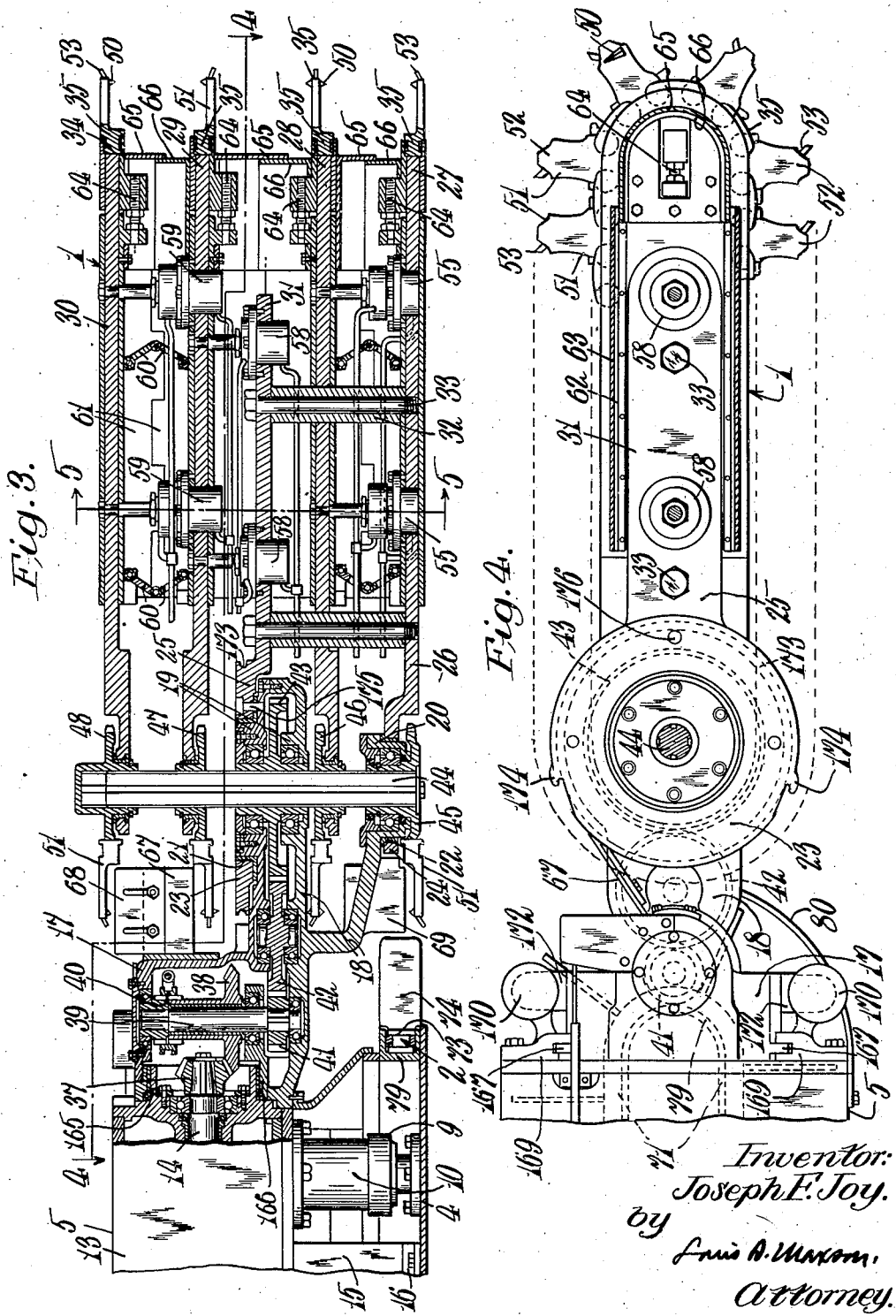
Inventor:
Joseph F. Joy.
by
[signature]
Attorney.

Aug. 4, 1942.    J. F. JOY    2,291,633
MINING MACHINE
Original Filed May 20, 1937   10 Sheets-Sheet 4

Inventor:
Joseph F. Joy.
by
Louis A. Maxson.
Attorney.

Aug. 4, 1942. J. F. JOY 2,291,633
MINING MACHINE
Original Filed May 20, 1937 10 Sheets-Sheet 5

Inventor:
Joseph F. Joy.
by
Louis A. Maxson,
Attorney.

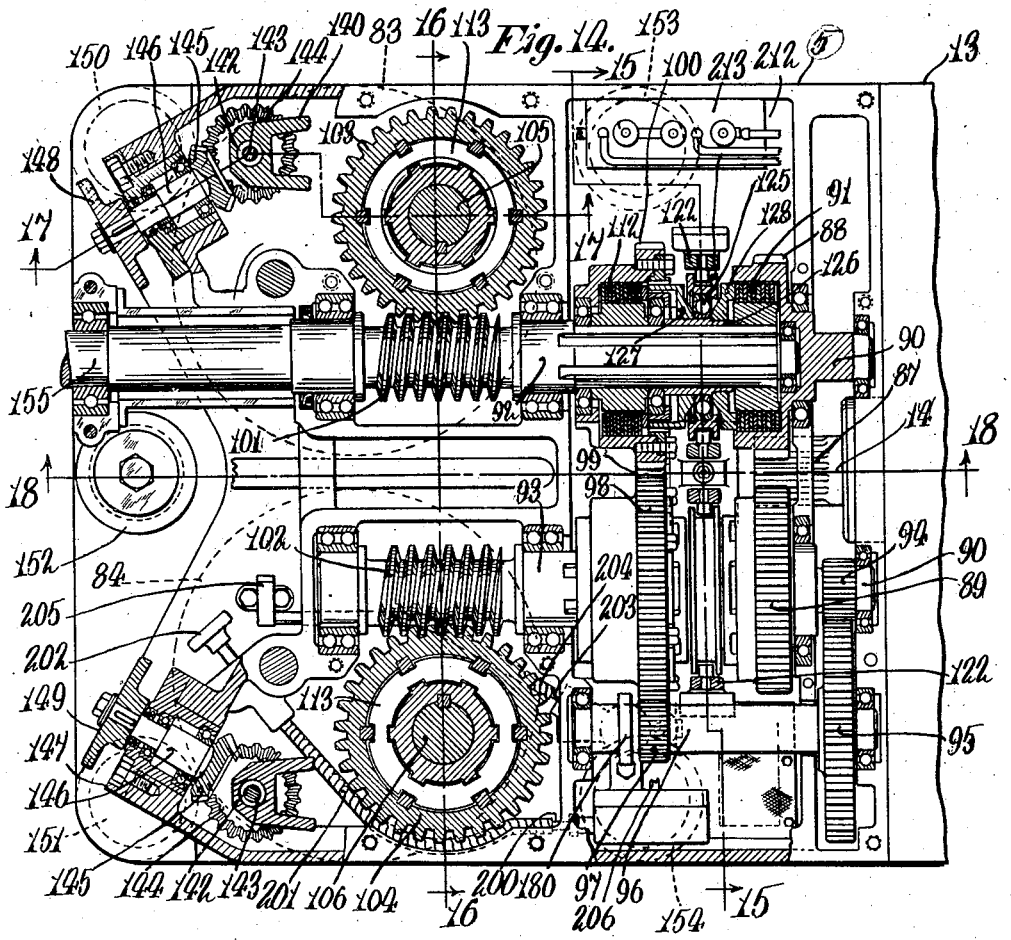
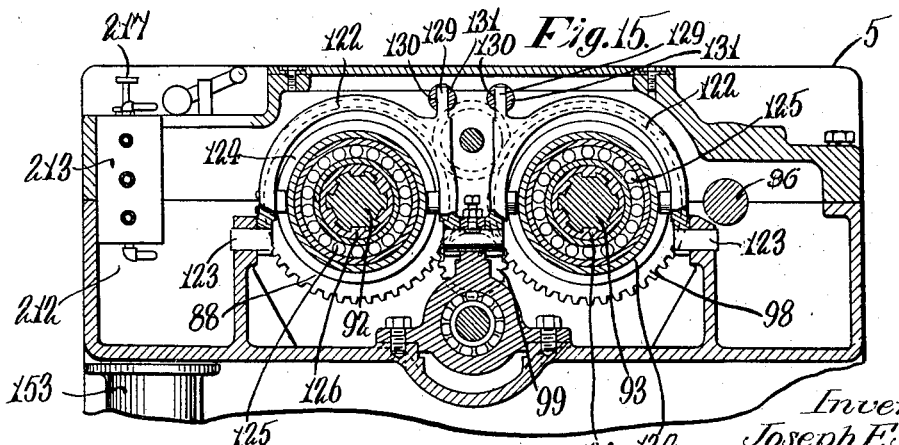

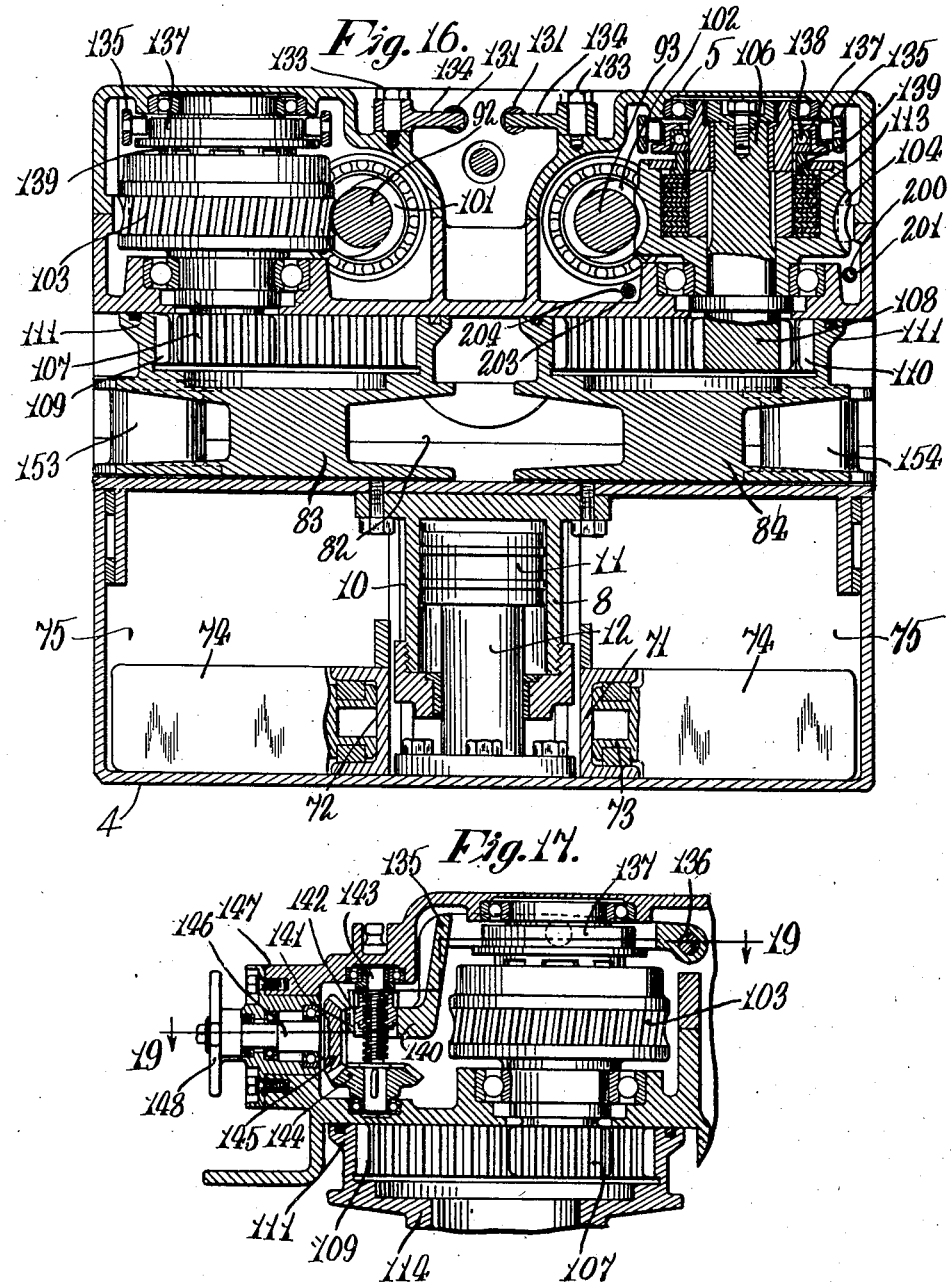

Aug. 4, 1942.   J. F. JOY   2,291,633
MINING MACHINE
Original Filed May 20, 1937   10 Sheets-Sheet 8
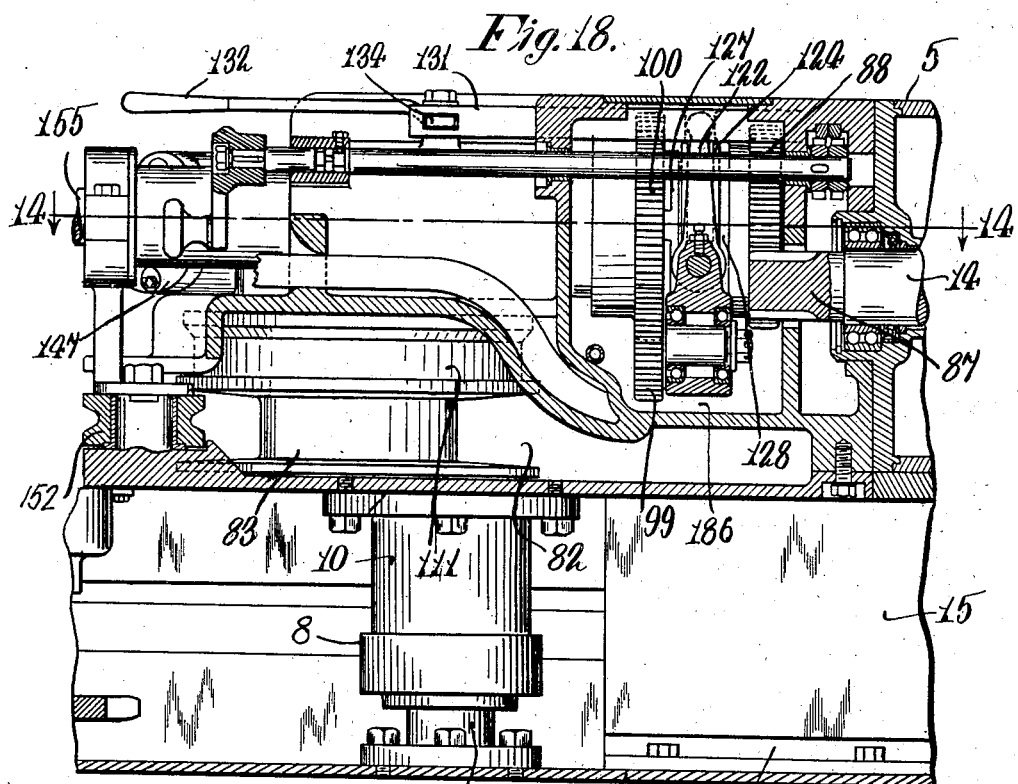
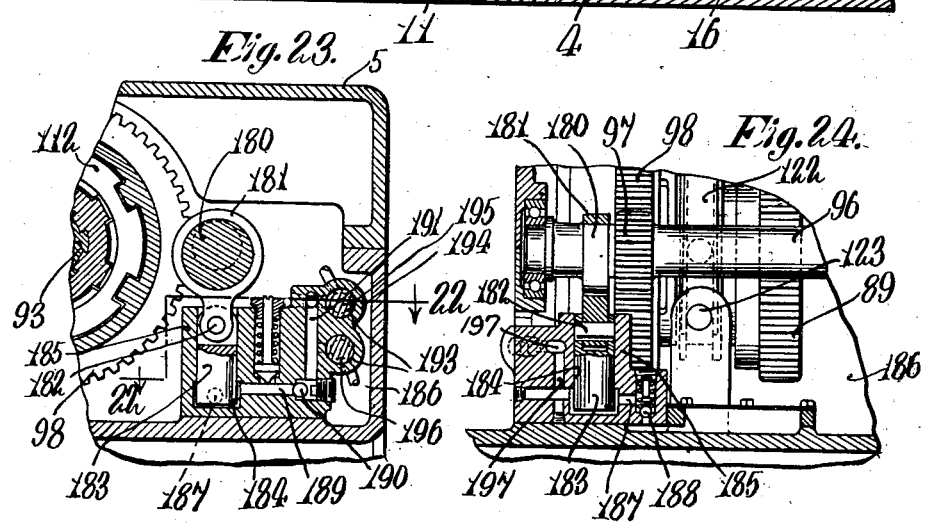
INVENTOR.
Joseph F. Joy.
BY
ATTORNEY.

Aug. 4, 1942.  J. F. JOY  2,291,633
MINING MACHINE
Original Filed May 20, 1937  10 Sheets-Sheet 9
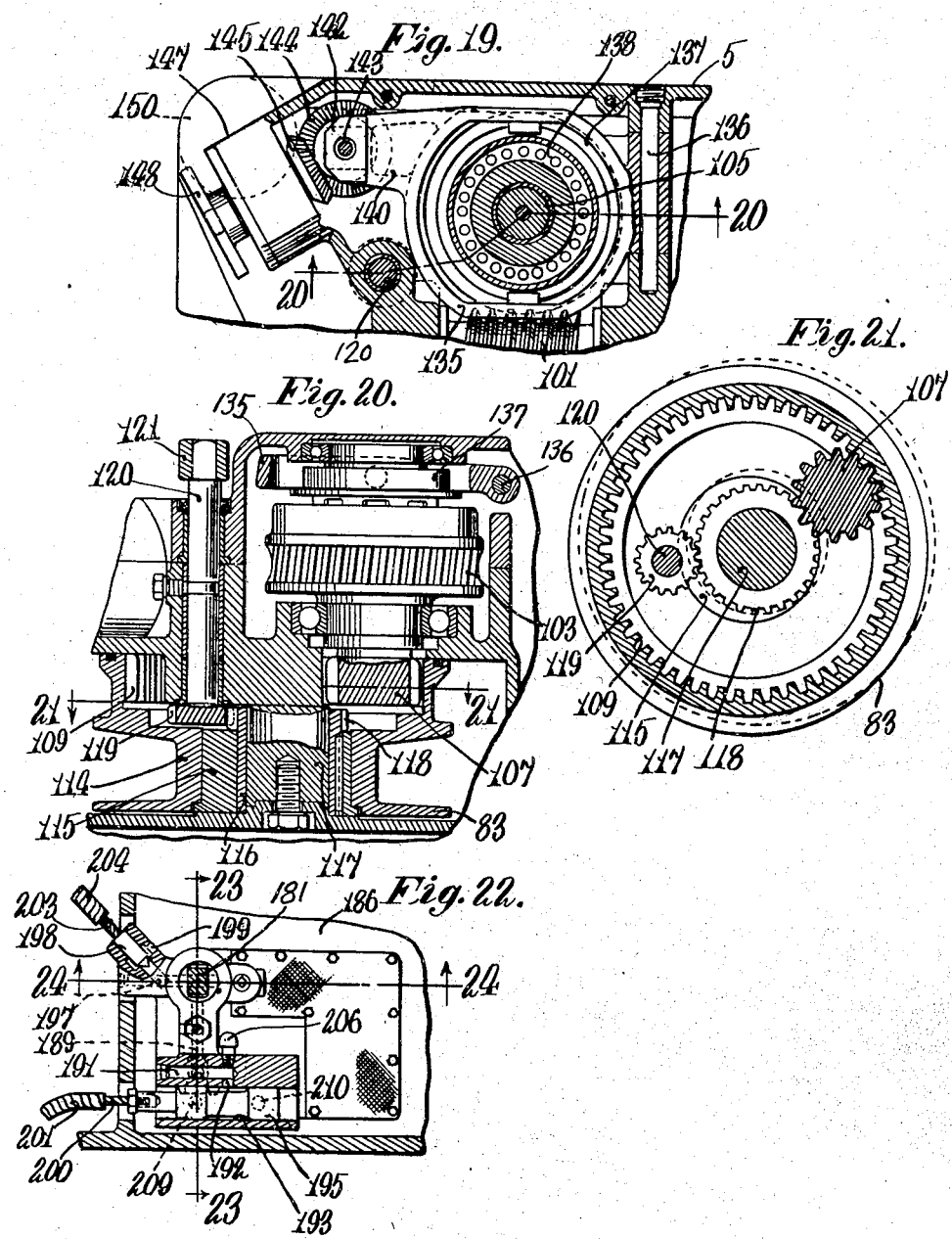
INVENTOR.
Joseph F. Joy.
BY
Louis A. Maxson.
ATTORNEY.

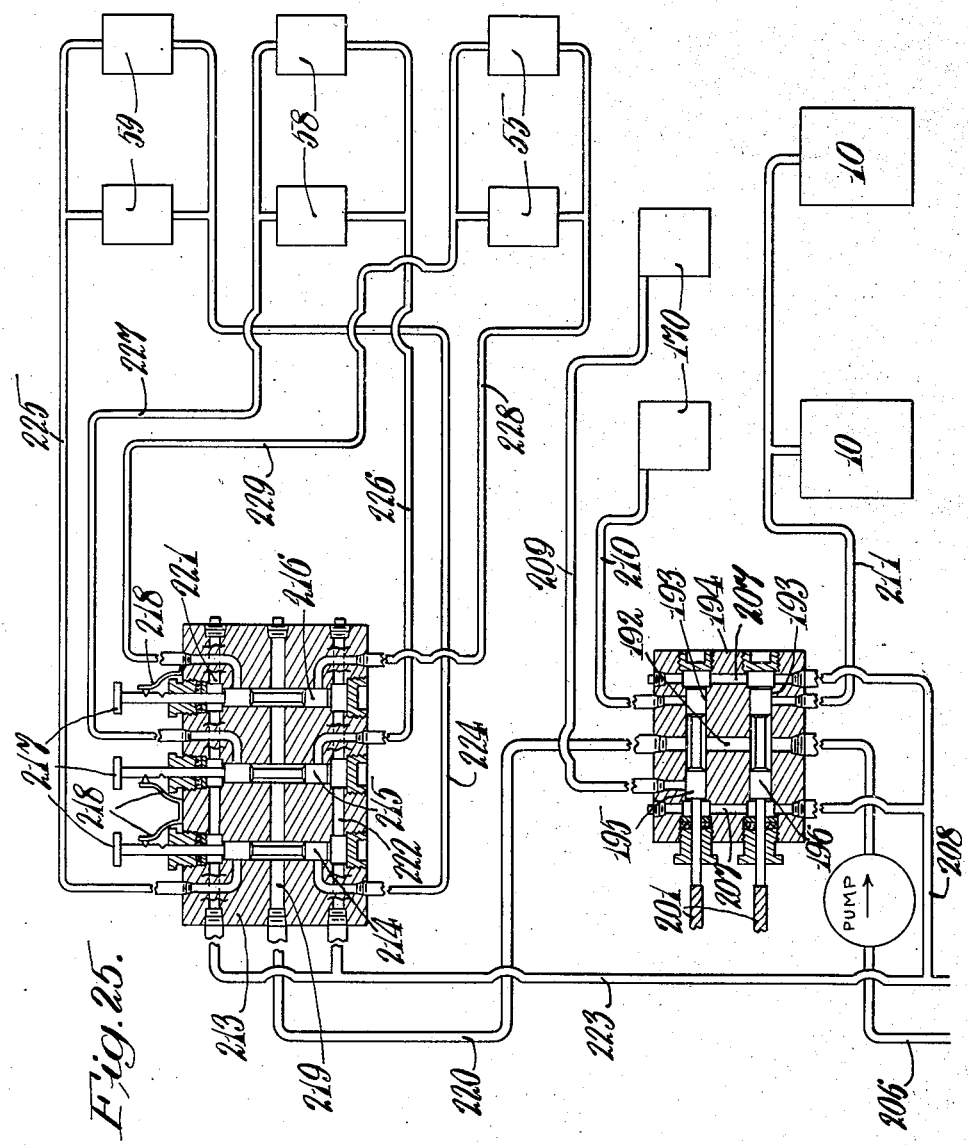

Patented Aug. 4, 1942

2,291,633

UNITED STATES PATENT OFFICE 2,291,633

MINING MACHINE

Joseph F. Joy, Franklin, Pa., assignor to Sullivan Machinery Company, a corporation of Massachusetts Continuation of application Serial No. 143,810, May 20, 1937. This application May 21, 1940, Serial No. 336,485

17 Claims. (Cl. 262—30)

This invention relates to mining machines, and more particularly to improvements in a coal mining machine of the combined cutting and loading, longwall type for cutting the solid coal, dislodging the cut coal from the solid and loading the dislodged coal.

An object of this invention is to provide an improved coal mining machine embodying cutting and dislodging means for completely removing the solid coal from a coal seam wholly without the use of explosives or other blasting means. Another object is to provide an improved coal mining machine of the combined cutting and loading type for cutting the solid coal in a coal seam, dislodging the cut coal from the solid and loading the dislodged coal. A further object is to provide an improved coal mining machine of the combined cutting and loading type particularly designed for use in accordance with the longwall system of mining. Yet another object is to provide an improved coal mining machine of the longwall, floor cutter type having improved means for cutting and dislodging the coal and for conveying the dislodged coal away from the coal face. Yet another object is to provide an improved coal cutting and loading machine having improved conveying means associated with the cutting and dislodging means in an improved manner. Another object is to provide an improved mechanism for adjusting and feeding the cutting and dislodging mechanism with respect to the coal face, and improved means for driving the cutting and dislodging mechanism and the adjusting and feeding means therefor. Yet another object is to provide an improved elevating mechanism for the cutting mechanism whereby the coal may be cut at different elevations with respect to the mine floor, and having embodied therein improved means for operating the cutting mechanism to dislodge the coal in an improved manner. A further object is to provide an improved mining machine of the above character having novel combinations and arrangements of parts whereby extreme compactness is attained, thereby enabling the machine to operate in the relatively restricted space between the coal face and the mine props. These and other objects and advantages of the invention will, however, hereinafter more fully appear.

In the accompanying drawings there are shown for purposes of illustration one form and a modification thereof which the invention may assume in practice.

In these drawings:

Fig. 2 is a side elevational view of the mining machine shown in Fig. 1.

Fig. 3 is an enlarged view in longitudinal vertical section taken substantially on line 3—3 of Fig. 1.

Fig. 4 is a horizontal sectional view with parts shown in plan, taken substantially on line 4—4 of Fig. 3.

Fig. 5 is an enlarged cross sectional view taken substantially on line 5—5 of Fig. 3.

Fig. 6 is a fragmentary view similar to Fig. 5 showing the cutting and dislodging bars in a different adjusted position.

Fig. 7 is a fragmentary sectional view taken on the plane of Fig. 5 showing a modified form of construction.

Fig. 14 is a horizontal sectional view taken substantially on line 14—14 of Figs. 2 and 18.

Fig. 15 is a cross sectional view taken substantially on line 15—15 of Fig. 14.

Fig. 16 is a cross sectional view taken substantially on line 16—16 of Figs. 1 and 14.

Fig. 17 is a detail vertical sectional view taken substantially on line 17—17 of Fig. 14.

Fig. 18 is a view in longitudinal vertical section with parts in elevation, taken substantially on line 18—18 of Figs. 1 and 14.

Fig. 19 is a horizontal sectional view taken substantially on line 19—19 of Fig. 17.

Fig. 20 is a detail vertical sectional view taken substantially on line 20—20 of Fig. 19.

Fig. 21 is a detail horizontal sectional view taken on line 21—21 of Fig. 20.

Fig. 22 is a detail horizontal sectional view taken substantially on line 22—22 of Fig. 23.

Fig. 23 is a detail vertical sectional view taken on line 23—23 of Fig. 22.

Fig. 24 is a detail view in longitudinal vertical section taken on line 24—24 of Fig. 22.

Fig. 25 is a diagrammatic view illustrating the hydraulic fluid system and its associated control means.

In this illustrative embodiment of the invention there is shown a coal mining machine of the combined cutting and loading, longwall type, mounted on its own bottom for sliding movement over the mine floor, although it will be evident that the machine, if desired, may be truck mounted or tractor tread mounted, and that various features of the invention may be embodied in mining machines of various other types. In this embodiment of the invention, cutting and dislodging mechanism is associated with conveying means for cutting the solid coal, dislodging the cut coal from the solid and moving the dislodged coal toward the receiving portion of the conveying means, the conveying means receiving the dislodged coal and moving the latter away from the coal face toward an elevated discharge position.

Figure 11:
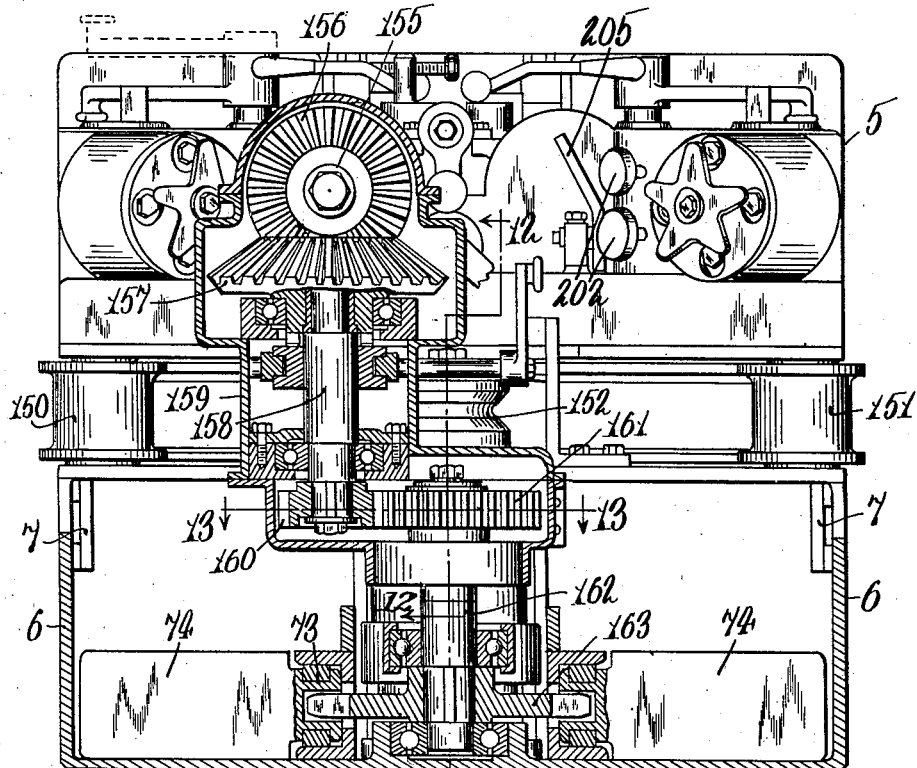
Fig. 11 is an enlarged cross sectional view taken substantially on line 11—11 of Fig. 1.
Figure 12:
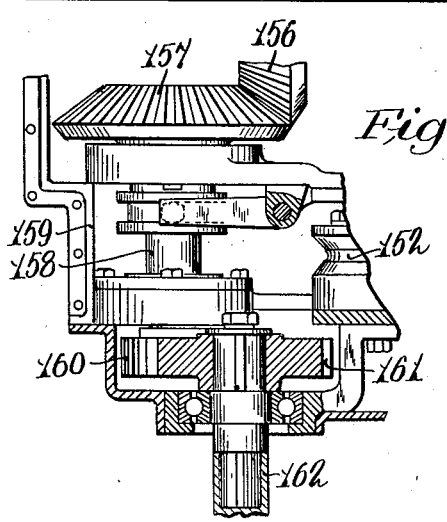
Fig. 12 is a detail vertical sectional view taken on line 12—12 of Fig. 11.
Figure 13:
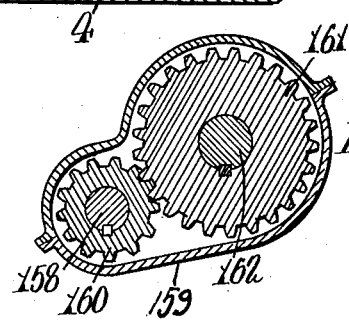
Fig. 13 is a detail horizontal sectional view taken on line 13—13 of Fig. 11.

In this illustrative embodiment of the invention, the reference character 1 generally designates the cutting and dislodging mechanism, 2 the associated conveying means and 3 the feeding means for the machine. The machine more specifically comprises a base frame 4, in the form of a bottom skid, adapted to rest upon and slide in any direction over the mine floor, and mounted for adjustment in a vertical direction relative to this bottom skid is a main frame 5, by which the cutting and dislodging mechanism 1 is supported. The bottom skid 4, as shown in Fig. 11, has vertical side walls 6, 6, and guided at the inner sides of these side walls are depending guide portions 7, 7 formed integral with the bottom of the main frame 5, and these vertical side walls 6 and the depending guide portions 7 cooperate in the guiding of the main frame during adjustment of the latter in a vertical direction relative to the bottom skid. For adjusting the main frame in a vertical direction relative to the bottom skid, there is provided hydraulically operated elevating means comprising a pair of hydraulic jacks 8 and 9 arranged at the longitudinal vertical center of the machine, as indicated in dotted lines in Fig. 1. These hydraulic jacks each comprise, as shown in Fig. 16, a vertical cylinder 10 secured to the bottom of the main frame 5 and containing a piston 11 having its piston rod 12 secured to the skid bottom. When hydraulic pressure is supplied to the upper ends of the elevating cylinders, the latter are moved in a vertical direction relative to the pistons to effect elevating of the main frame together with the cutting and dislodging mechanism supported thereby, for a purpose to be later described. Arranged centrally longitudinally of the machine, between the hydraulic jacks, is guiding means, supplementing the vertical guides at the sides of the main frame and bottom skid, comprising cooperating vertical guide plates 15 and 16 arranged in overlapping sliding relation and respectively secured to the main frame and bottom skid. Means for supply hydraulic pressure to the elevating cylinders will later be described. Supported by the main frame 5 is a horizontal motor 13, preferably of the reversible type, having its power shaft 14 horizontally disposed and extending longitudinally of the machine, and this motor is adapted to drive, as will later be explained, the cutting and dislodging mechanism and the feeding and conveying means, together with the various hydraulically operated devices of the machine.

Now referring to the improved cutting and dislodging mechanism 1, it will be observed that secured to the rear end of the main frame 5 is a rearwardly projecting support 17 having rearwardly projecting arms 18 supporting upper cylindrical bearing supports 19 and a lower bearing support 20. Supported by these bearing supports are bearing sleeves 21 and 22, respectively, on which are swively mounted circular bearing portions 23 and 24, respectively, formed integral with upper and lower hanger frames 25 and 26. These hanger frames are swingable horizontally within their bearings relative to the main frame 5 of the machine and support at the rear end of the machine a series of superimposed, parallel, horizontal cutting and dislodging bars respectively designated by the reference characters 27, 28, 29 and 30. The bottom bar 27 is rigidly secured to the lower hanger frame 26, while a support 31, interposed between the bars 28 and 29, is rigidly secured to the hanger frame 25. The bottom bar 26 and the support 31 are rigidly connected together by spacing sleeves 32 and connecting bolts 33 extending centrally through the spacing sleeves, and these spacing sleeves may form vertical guides for the bar 28. Guided in guideways 34 formed about the margins of the superimposed bars are endless cutting and dislodging chains 35, herein of the reversible type. The driving means for these cutting and dislodging chains comprises a bevel gear 37 fixed to the rear end of the power shaft 14 of the motor 13 and meshing with a horizontal bevel gear 38 having its hub journaled on bearing sleeves supported by a vertical shaft 39 suitably journaled within the support 17. Keyed to the upper end of this shaft is a clutch member connectible by a sliding jaw clutch 40 to a clutch member formed on the hub of the bevel gear 38. Keyed to the lower end of the shaft 39 is a spur gear 41 meshing with an idler gear 42 in turn meshing with and driving a large spur gear 43 having its hub journaled in bearings supported by the upper bearing supports 19 and keyed to a vertical drive shaft 44. Journaled in bearings supported by the lower bearing support 20 and keyed to the shaft 44 is the hub of a chain sprocket 45, while journaled within the cutter bars 28, 29, 30 are the hubs of chain sprockets 46, 47 and 48, respectively, and these chain sprockets engage and drive the cutting and dislodging chains 35. The sprockets 46, 47 and 48 are splined to the drive shaft 44, and this splined connection permits adjustment of the sprockets axially relative to the shaft 44 while the driving relation is always maintained, for a purpose to be later explained.

As the series of superimposed cutting and dislodging bars are swung horizontally about their pivotal axes, the cutting and dislodging chains cut a series of superimposed horizontal slots in the solid coal to form projections of coal between the slots, and the means for periodically breaking down fragments of the coal projections between the slots as cutting progresses comprises coal breaking wedges 50 secured to a chain block 51 of each chain. In the modification shown in Fig. 7, the coal breaking wedges are omitted from the chains, and the coal projections between the slots cut by the cutter chains are broken down by operating the bar-elevating jacks vertically to adjust the bars to cause the cutter chains to act laterally on the coal projections, as hereinafter mentioned. The reversible cutting and dislodging chains each comprise a series of chain blocks pivotally connected by strap links, and each chain block has a lateral lug 52 formed with oppositely disposed sockets adapted selectively to receive a cutter bit 53. When the cutting and dislodging chains are driven in one direction, the bits are all disposed in the front sockets, and when it is desired to reverse the direction of the drive of the chains, the cutter bits may be reversed within the lug sockets, in a well known manner. In this illustrative construction, the four superimposed cutting and dislodging chains on the bars are operative to cut four parallel horizontal slots in the solid coal to form three parallel horizontal projections of coal between the slots, and as the cutters penetrate the coal a certain depth, the wedges on the chains act laterally on the coal projections to break down fragments of the latter.

In this improved construction, the cutting and dislodging bars are adjustable toward one another in parallelism to vary the distance between the cutters, and, as a result, to vary the thickness of the coal projections between the slots. This bar-adjusting means comprises hydraulic cylinders 55 supported by the lower cutter bar 27 and containing reciprocable pistons 56 having piston rods 57 projecting upwardly through the upper packed cylinder heads and rigidly fixed at their upper ends to the bar 28. Similar cylinders 58 and 59 are supported by the support 31 and the cutter bar 29, respectively, and contain pistons connected to the two upper bars 29 and 30. It will thus be seen that when hydraulic pressure is supplied to the cylinders 55, 58 and 59, the bars 28, 29 and 30 may be adjusted toward and from one another and relative to the lower bar 26, thereby to vary the distance between the series of parallel cutters. The series of superimposed cutting and dislodging bars are flexibly connected together by means preventing relative tilting of the bars, so that the latter are always maintained in parallel relation, and this means comprises pairs of pivoted links 60 connected between bars 27, 28, 29, 30 near the opposite ends thereof, and similar pairs of pivoted links 61 are connected near the opposite side edges of the bars, with their axes of pivotal connection arranged at right angles to the axes of pivotal connection of the links 60. Arranged between the bars 28 and 29 are cooperating vertical guide plates 62 and 63 having overlapping guiding portions, and respectively secured to the bars 28 and 29. These hinged link connections and vertical guide plates for the series of bars always maintain the latter in parallel relation irrespective of their positions of relative adjustment. Each bar is provided with an adjusting screw 64 so that the outer ends of the bar may be adjusted relative to the main body thereof, to provide means for tightening the cutting and dislodging chains guided on the bars. The spaces between the bars at the outer ends thereof are closed by telescopically arranged closure members 65 and 66, the former secured to the upper bars and the latter to the lower bars, and these members move with the bars during adjustment thereof, so that the spaces are always maintained closed irrespective of the relatively adjusted position of the bars. Similar closure means may be provided between the bars along the length thereof, if desired. The links 61, guide plates 62, 63 and the closure members cooperate to provide obstructions between the bars to preclude the passage of the dislodged coal between the bars, thereby to insure proper delivery of the coal to the conveying means. A vertical deflector 67 has vertically adjustable thereon, through a bolt and slot connection, a deflector portion 68, and this deflector projects in the space between the cutting and dislodging chains of the upper bars 29 and 30 for deflecting the coal from the paths of the chains as the coal is received by the conveying means. When the two upper bars are relatively adjusted, the deflector portion 68 may also be adjusted, to accommodate the variation in width of the spaces between the upper parallel cutters, thereby to insure proper deflection of the dislodged coal. A similar deflector 69 rigidly fixed to the lower arm 18 of the bottom bearing support, projects between the chains of the lower bars 27 and 28, and similarly deflects the dislodged coal from the paths of the chains. The frame portions 19 of the upper bearing supports project between the chains of the bars 28 and 29 for a similar purpose. The number of bars may be varied.

The conveying means 2 extends longitudinally of the machine beneath the main frame 5 and has its receiving portion disposed near the floor level adjacent the rear ends of the cutting and dislodging bars, for receiving the dislodged coal carried back from the coal face by the cutting and dislodging chains and for moving the dislodged coal longitudinally through the bottom of the machine to discharge at an elevated position at the forward end thereof. This conveying means is herein of a well known type comprising longitudinally arranged channel members 71, 71 having their bottom flanges fixed to the bottom of the skid base and providing guideways 72 for an endless drive chain 73 of the conveyor. This drive chain comprises a series of articulated links connected together by suitable pairs of horizontal and vertical pintles to render the same flexible in both horizontal and vertical planes and to permit the same to follow the contour of the conveyor guideways. It will be understood, however, that any other type of chain which is adapted to flex in horizontal and vertical planes may be substituted for that above described without departure from the spirit of the invention. Secured to certain of the chain links are conveyor flights 74 adapted to move through parallel passages 75, 75 extending longitudinally through the bottom of the machine below the main frame, and these flights may be of any preferred form adapted to move the broken coal along one or the other of the passages 75 as the conveyor is driven in one direction or the other. As shown most clearly in Fig. 2, the base skid 4 is provided with a horizontal forward portion 76 arranged in an elevated position a substantial distance above the mine floor, and an inclined portion 77 extending between the horizontal portion 76 and the main body of the skid, and the conveyor guideways extend rearwardly along the bottom of the skid base upwardly along the inclined portion 77 and forwardly of the machine along the horizontal portion 76, and the rear end of the conveyor chain passes around a curved guide 78 connecting the ends of the channel guide members 71, 71. A similar curved guide member 79 is arranged at the rearward ends of the channel members 72 for guiding the receiving portion of the conveyor chain as it passes beneath the forward end of the main frame, and this guide is arranged closely to the skid bottom so that the conveyor flights pass across the rearward end of the skid base near the floor level to receive the broken coal moved rearwardly from the coal face by the cutting and dislodging chains. Attachable to the front end of the main frame at either side thereof is an arcuate retaining plate 80 for retaining the coal in the path of the receiving portion of the conveyor. The conveyor flights move the broken coal through the bottom of the machine, upwardly along the inclined portion 77 of the skid base and forwardly along the horizontal portion 76 to discharge at the front end of the machine on a suitable lateral conveyor generally designated 81 and indicated in construction lines in Fig. 1. The conveyor 81 may be of any suitable type to convey the coal discharged from the conveyor of the machine laterally away from the coal face, and may be mounted on the machine or independently thereof, as desired. The driving means for the drive chain 73 of the conveyor of the conveying means 2 will later be described, and the conveyor 81 may be driven either from the machine motor or by an independent motor.

Now referring to the feeding means 3, it will be noted that arranged within a transverse horizontal chamber 82, extending across the forward portion of the main frame, are horizontal cable winding drums 83 and 84, respectively cooperating with feed cables 85 and 86. The mechanism driven by the motor 13 for driving the cable winding drums in winding direction comprises a spur motor pinion 87 secured to the forward end of the motor power shaft 14 and meshing with spur gears 88 and 89 having their hubs secured to coaxial shafts 90 suitably journaled within the main frame. These gears are connectible by disc clutches 91 to shafts 92 and 93 respectively. These shafts are alined with the shafts 90 and are arranged in parallel relation on horizontal axes extending longitudinally of the machine, in the manner shown in Fig. 14. Formed on the shaft 90 of the spur gear 89 is a spur gear 94 meshing with a spur gear 95 keyed to a horizontal, longitudinally extending shaft 96, herein arranged parallel with the shafts 92 and 93. Fixed to the shaft 96 is a spur gear 97 meshing with a spur gear 98 arranged coaxially with the spur gear 89. The spur gear 98 meshes with an intermediate gear 99 in turn meshing with and driving a spur gear 100 arranged coaxially with the spur gear 88. These gears and shafts are suitably journaled within the main frame 5, and formed integral with the shafts 92 and 93 are worms 101 and 102 having teeth of the same pitch and inclination and meshing respectively with worm wheels 103 and 104 herein arranged on vertical axes parallel with the winding drum axes. Since the worm wheels mesh respectively with the opposite sides of the worms, the latter, as they rotate in the same direction, effect rotation of the worm wheels in relatively opposite directions. As shown in Fig. 16, the hubs of the worm wheels are suitably journaled within bearings supported within the main frame, and journaled within the worm wheel hubs are vertical shafts 105, 106 having secured at their lower ends spur gears 107, 108 meshing with large internal gears 109, 110 formed integral with the upper flanges 111 of the cable winding drums 83 and 84, respectively. The gears 88 and 89 constitute the high speed terminal gears of the high speed transmission, while the gears 98 and 100 constitute the low speed terminal gears of the low speed transmission, and the gears 98 and 100 are connectible by disc clutches 112 to the shafts 92 and 93, respectively. The worm wheels 103 and 104 are connectible by disc clutches 113 to the vertical shafts 105 and 106 respectively. Eccentric mounting means is provided for the cable winding drums for moving the internal gears on the latter into and out of mesh with the spur driving gears comprising, for each drum, as shown most clearly in Figs. 20 and 21, a drum hub 114 journaled on an eccentric sleeve 115 in turn keyed to a bearing sleeve 116 rotatably mounted on a vertical shaft 117. The means for rotating the eccentric sleeve to move the internal gear into and out of mesh with the drum driving gear comprises gear teeth 118 formed on the upper end of the sleeve 116 and meshing with a spur gear 119 formed on a vertical operating shaft 120 provided with an operating lever 121. It will thus be seen that when the lever is operated to rotate the shaft 120, the eccentric sleeve is rotated through the spur gears 119, 118, thereby moving in one direction or the other the cable winding drum bodily in an arcuate path about the axis of the vertical shaft 117 to move the internal gear into and out of mesh with the drum driving gear.

Figure 1:
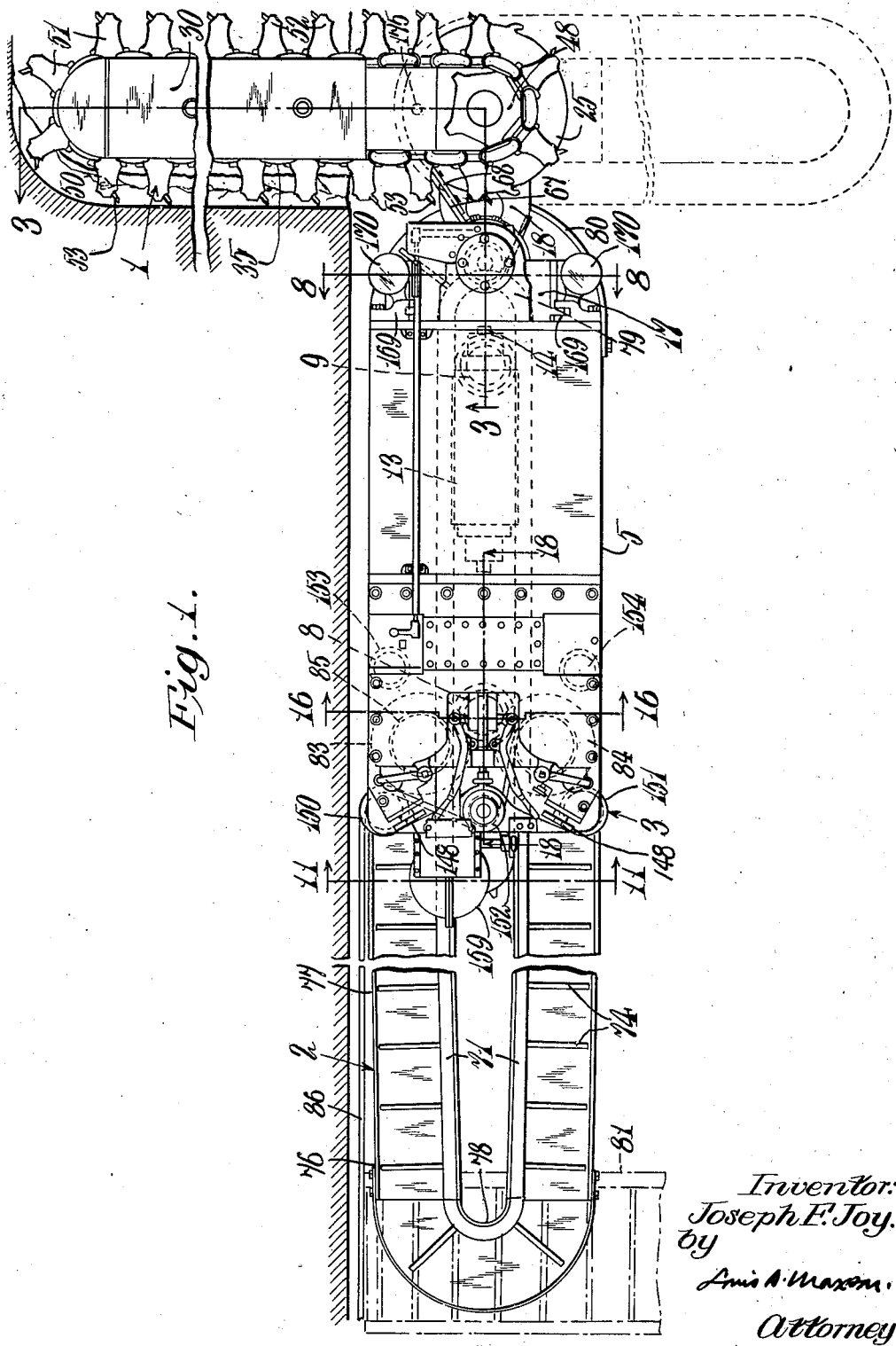
Fig. 1 is a top plan view of a coal mining machine constructed in accordance with the illustrative embodiment of the invention.

The operating means for the disc clutches 91 and 112, as shown in Figs. 14 and 15, comprises shipper yokes 122 pivotally mounted at 123 within the main frame and engaging clutch applying rings 124 supported by ball thrust bearings 125 slidably mounted on sleeves 126, in turn supported on the shafts 92 and 93 respectively. The inner race of the thrust bearing 125 engages clutch applying members 127 and 128 for the clutches. Each of the shipper yokes has an upstanding projection 129 projecting within slots 130 formed in operating rods 131, 131. These operating rods are arranged in parallel relation on longitudinal axes within the upper portion of the main frame, and levers 132, 132 are pivotally mounted at 133 and have projecting arms 134 engaged in slots formed in the operating rods 131. It will thus be seen that when the levers are swung about their pivots, the rods are swung to swing the shipper yokes axially to move the clutch operating rings to move one or the other of the clutch operating members into clutch operating position. The operating means for the drum clutches 113 comprises shipper yokes 135 pivotally mounted at 136 and engaging clutch applying rings 137 connected through ball thrust bearings 138 to clutch applying members 139, the shipper yokes and lever portions 140 being formed within bifurcated ends 141 connected to nuts 142 (Fig. 17). These nuts are threadedly engaged with vertical operating screws 143 suitably journaled within the main frame 5 and having keyed thereto bevel gears 144 meshing with bevel gears 145 formed on horizontal operating shafts 146. These shafts are suitably journaled within projecting bearing bosses 147 integral with the main frame, and have fixed thereto operating handles 148, 149, respectively. It will thus be seen that when the operating handles are rotated, the nuts move axially, thereby swinging the shipper yokes vertically about their pivots, and, as a result, the clutch applying rings are moved axially into clutch applying position. As shown in Fig. 1, these clutch operating handles 148, 149 for the drum clutches are conveniently located at the opposite sides of the forward end of the main frame so that the operator may readily control drum rotation.

Means is provided for guiding the feed cables 85 and 86 with respect to the cable winding drums, comprising horizontal guide sheaves 150 and 151 arranged at the opposite front corners of the main frame 5 at the opposite sides of the cable winding drums, while arranged between these sheaves at the forward sides of the drums is a centrally located horizontal guide sheave 152. Arranged at the sides of the main frame at the rear sides of the cable winding drums are similar horizontal guide sheaves 153 and 154. The feed cables may be extended from the cable winding drums around these various guide sheaves in various manners as is well known by those skilled in the art.

Now referring to the driving means for the conveyor of the conveying means 2, it will be noted that formed integral with the shaft 92 is an alined shaft portion 155 (see Fig. 14) having keyed to its forward end a bevel gear 156 (Fig. 11) meshing with a bevel gear 157 clutched to a vertical drive shaft 158. This drive shaft is suitably journaled within a housing 159 secured to the forward end of the main frame and has keyed thereto at its lower end a spur gear 160 meshing with a spur gear 161 keyed to a vertically disposed, telescopic drive shaft 162. This vertical shaft is suitably journaled within bearings supported respectively by the housing 159 and the bottom of the skid base and is self-adjusting to compensate for the different elevated positions of adjustment of the main frame 5 with respect to the bottom skid. Keyed to and driven by the vertical shaft 162 is a sprocket 163 engaging and driving the endless drive chain 73 of the conveyor. It will thus be seen that when the disc clutch 91 is applied, the conveyor may be driven from the motor through the spur gearing 87, 88, clutch 91, shaft 92, bevel gearing 156, 157, spur gearing 160 and 161, telescopic shaft 162 and the drive sprocket 163. When the clutch 91 is released, the conveyor may, of course, remain idle during running of the motor.

Figure 8:
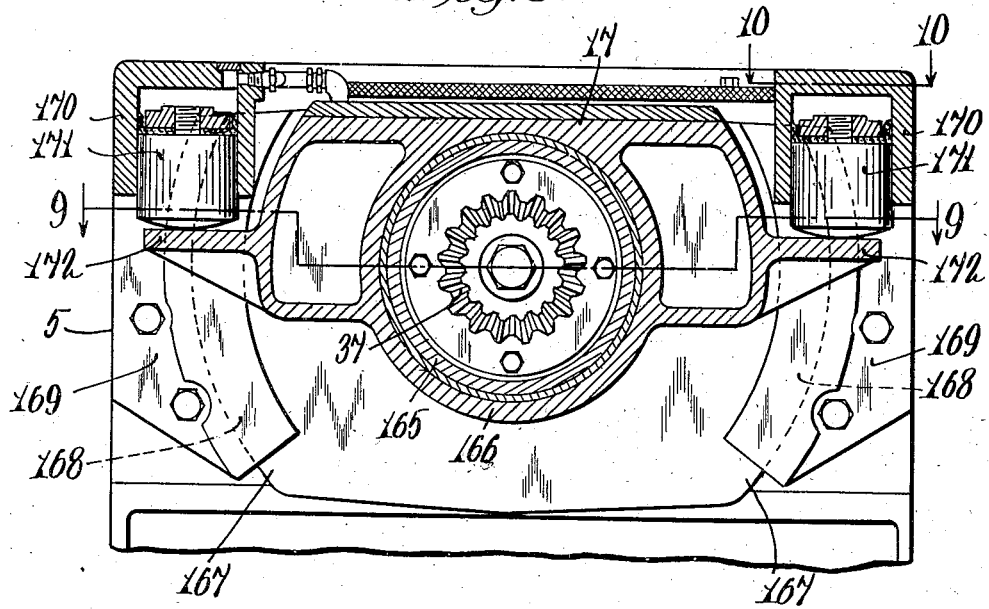
Fig. 8 is an enlarged transverse vertical sectional view taken substantially on line 8—8 of Fig. 1.
Figure 9:
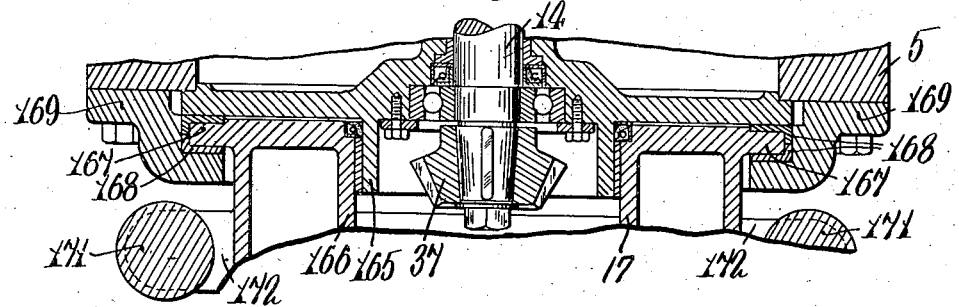
Fig. 9 is a horizontal sectional view taken substantially on line 9—9 of Fig. 8.
Figure 10:
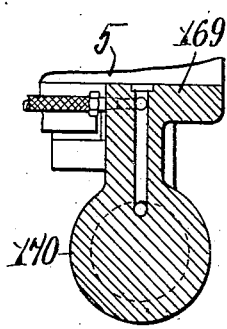
Fig. 10 is a detail sectional view taken on line 10—10 of Fig. 8.

Again referring to the cutting and dislodging mechanism, and more particularly to the supporting structure therefor, it will be noted that the hanger frame support 17 is mounted on the main frame to rock relative thereto about a horizontal axis extending longitudinally of the machine so that the cutting and dislodging bars may be tilted with respect to the horizontal, thereby to enable the cutting and dislodging mechanism to follow an uneven mine floor or rolling bottom. Secured to the rear end of the main frame at the rear end of the motor is a cylindrical bearing projection or bearing annulus 165 (Figs. 3 and 9) supporting a bearing sleeve on which is rotatably mounted a cylindrical bearing portion 166 integral with the support 17. Projecting laterally from the opposite sides of the support 17 are vertical arcuate flanges 167 guided within arcuate bearing elements 168 supported within guide brackets 169 secured to the opposite sides of the rear end of the main frame. It will thus be seen that the support 17 is mounted to rock about its bearing on the cylindrical bearing projection with respect to the main frame of the machine. Means is afforded for tilting the support 17 by power, comprising, as shown most clearly in Fig. 8, vertical cylinders 170, 170 preferably formed integral with the guide brackets 169 and containing reciprocable pistons 171, 171. The bottom curved surfaces of these pistons engage lateral projections 172 extending from the sides of the support 17 and formed integral therewith. It will thus be seen that when hydraulic pressure is supplied to one or the other of the cylinders, the pistons may be moved to rock the support 17 within its bearing mounting relative to the main frame 5, and by trapping the liquid within the cylinders, the support 17 may be locked in its adjusted position. The means for supplying hydraulic pressure to the support-rocking cylinders will later be described.

The means for swinging the series of superimposed cutting and dislodging bars horizontally about their pivotal axes relative to the rear support and main frame comprises an arcuate cable guiding groove 173 formed on the upper hanger frame 23, and the cable 86 of the feed drum 84 may be extended around certain of the guide sheaves and in one direction or the other around this arcuate guide groove selectively to suitable attaching devices 174 arranged at the opposite sides of the hanger frame, and, when the cable is wound in by its drum, the bars may be swung horizontally in unison in one direction or the other. A suitable detachable pin lock 175, which is adapted for insertion in registering openings 176 in the hanger frame and bearing support, is employed for locking the series of superimposed bars either in a longitudinal position or a right angle position at either side of the machine.

The means for supplying hydraulic pressure to the various hydraulically operated devices comprises, as shown most clearly in Figs. 23 and 24, an eccentric 180 integral with the drive shaft 96, and engaging this eccentric is an eccentric strap 181 pivotally connected at 182 to a pump plunger 183. This pump plunger is reciprocably mounted in a bore 184 of a pump cylinder 185 supported within a chamber 186 within the main frame. Communicating with the lower end of the pump cylinder bore is an intake 187 controlled by an intake valve 188 of the spring-pressed ball type. Also communicating with the lower end of the pump cylinder bore is a discharge passage 189 controlled by a discharge valve 190 likewise of the ball type. The valve 190 controls the flow of liquid under pressure from the discharge passage 189 to a passage 191 communicating, as shown in Fig. 23, through a passage 192, with parallel horizontal valve bores 193 formed in a valve box 194 herein preferably formed integral with the pump cylinder and likewise arranged in the chamber 186. Guided within these valve bores are slide valves 195 and 196 herein of the balanced spool type, and the passage 192 communicates with the valve bores between the spools of the valves in the manner shown in Fig. 25. Communicating with the lower end of the pump cylinder bore is a by-pass passage 197 controlled by a valve 198 (Fig. 22) and communicating through a passage 199 with the liquid chamber. In this instance, the slide valves 195 and 196 are operated by flexible operating shafts 200 guided in flexible conduits 201 and having operating handles 202, while the by-pass valve 198 is operated by a flexible operating member 203 guided in a flexible conduit 204 and having an operating handle 205. The handles 202 and 205 are conveniently located at the front end of the main frame in adjacency to the control handles for the feed drum control clutches, as shown in Fig. 1. The pump intake communicates through a conduit 206 with the chamber 186 which herein contains a liquid, and the pump discharge, as above mentioned, communicates with the passage 192 which is herein a pressure supply passage. Formed in the valve box 194 and communicating with the valve bores at the opposite ends of the valves are discharge passages 207, 207 connected through a discharge conduit 208 back to the liquid chamber. The valve bore containing the valve 195 is connected through conduits 209 and 210 to the upper ends of the rocking cylinders 170, while the valve bore containing the valve 196 is connected through a conduit 211 with the upper ends of the elevating cylinders 10. Arranged within a chamber 212 formed in the main frame 5 at the side thereof opposite from the chamber 186 containing the pump and valve box 194 is a valve box 213 having vertical valve bores containing slide valves 214, 215 and 216 similar to the valves 195, 196 and having upstanding operating stems provided with handles 217. Spring-pressed detent locks 218 are provided for locking the valves in their different positions of adjustment. The valve box 213 is formed with a central pressure supply passage 219 connected through a conduit 220 with the pressure supply passage 192 of the valve box 194 and with discharge passages 221 and 222 connected by a conduit 223 back to the liquid chamber 186. The valve bore containing the valve 214 is connected through a conduit 224 to the lower ends of the bar-adjusting cylinders 59 and through a conduit 225 to the upper ends of these cylinders. The valve bore containing the valve 215 is connected through a conduit 226 to the lower ends of the bar-adjusting cylinders 58 and through a conduit 227 to the upper ends of these cylinders, while the valve bore containing the valve 216 is connected through a conduit 228 to the lower ends of the bar-adjusting cylinders 55 and through a conduit 229 to the upper ends of these cylinders. It will thus be seen that by adjusting the valves 195 and 196 hydraulic pressure may be supplied either simultaneously or separately to the rocking cylinders 170 and simultaneously to the elevating cylinders 10, and by adjusting the valves 214, 215 and 216 hydraulic pressure may be supplied to any one or any group of the bar-adjusting cylinders 55, 58 and 59 to either elevate or depress the bars.

The general mode of operation of the improved mining and loading machine is as follows: During maneuvering of the mining machine about the mine either one of the feed cables 85, 86 may have its free end connected to an extraneous abutment such as an anchor jack, and the high speed drive controlling disc clutch 91 may be applied to effect rotation of the winding drum in winding direction to move the machine at a relatively high moving speed toward the anchor jack. If desired both feed cables may be employed to effect maneuvering of the machine simply by connecting the free ends of both feed cables to anchor jacks located in advance of the machine. When the machine is in proper operating position with respect to the coal face, the disc clutch 91 of the conveyor driving means may be applied to effect circulation of the conveyor, and by shifting the jaw clutch 40 the cutting and dislodging mechanism may be connected in driving relation with the driving motor to effect rapid circulation of the cutting and dislodging chains about their guideways on the bars. The feed cable 86 may then be extended from the feed drum 84 around certain of the guide sheaves and longitudinally along the inner side of the machine and around the cable guiding groove 173 on the bar hanger frame into connection with one of the cable attaching means 174, and when the drum is rotated to wind in the cable the series of superimposed bars are swung in unison about their pivotal axes from a position with the longitudinal axes of the bars alined with the longitudinal axis of the machine to the right angle position shown in full lines in Fig. 1. The cutter bar hanger frames are then locked against swinging movement with respect to the support 17 by means of the locking pin 175, and the feed cable is thereafter disconnected from the bar hanger frame and extended around the inner guide sheave longitudinally of the machine to a suitable anchor jack located at the coal face in advance of the machine, and as the feed drum is rotated to wind in the feed cable the machine is fed bodily along the coal face in a direction parallel with the face to effect rectilinear, lateral feeding movement of the series of superimposed cutting and dislodging bars. As the bars are fed with respect to the coal, the series of superimposed cutting and dislodging chains act simultaneously to cut a series of superimposed horizontal slots in the solid coal to form projections of coal between the slots, and as cutting progresses the coal breaking wedges on the chains periodically act on the coal projections to break down fragments thereof. The rapidly moving cutting and dislodging chains move the dislodged coal toward the receiving portion of the conveyor, and the conveyor receives the coal and moves the same longitudinally beneath the machine to an elevated discharge position at the forward end of the machine, and the lateral conveyor 81 receives the discharged coal and moves the coal away from the coal face out of the path of the machine. By supplying hydraulic pressure to the bar-adjusting cylinders 55, 58 and 59 the spaces between the superimposed bars may be varied, thereby to vary the width of the coal projections cut by the chains, and by operating the elevating cylinders 10, the elevation of the series of superimposed cutting and dislodging bars with respect to the mine floor may be varied. When an uneven or rolling bottom is encountered, hydraulic pressure may be supplied to the rocking cylinders 170 to rock the support 17 about its axis with respect to the main frame of the machine, to tilt the series of superimposed bars with respect to the horizontal, and by trapping the liquid within these cylinders the bars and support may be locked in their adjusted position. During the cutting, dislodging and loading operations above described, if desired, the feed cable 85 may be extended from the feed drum 83 and in any suitable manner to a suitably located anchor jack, and the drum 83 may be rotated to wind in the cable to control the angular position of the machine with respect to the coal face. When it is desired to operate the machine in the opposite direction with respect to the coal face, to cut in the opposite direction, or to operate the machine to cut at an oppositely located coal face, the motor 13 may be reversed, the cutter bits and wedges of the cutting and dislodging chains reversed with respect to their respective chain block lugs, the cables rewound in the opposite direction on the cable winding drums, and the retaining member 80 moved to the opposite side of the machine; and as a result, the machine may be fed and the cutting and dislodging chains and conveying means driven in the opposite direction. Under certain conditions, the coal breaking wedges on the cutting chains may be omitted and the elevating cylinders 10 may be operated to vertically adjust the bars to cause the cutting chains to act laterally on the coal projections between the slots cut thereby, to break down the coal, and, if desired, the bar-adjusting cylinders 55, 58 and 59 may be similarly operated similarly to move the cutting chains to break down the coal projections. If extra clearance be desired to facilitate this mode of breaking, side bits may be used on the blocks as shown and described in my copending application Serial No. 143,809, now matured into Patent No. 2,210,919, patented August 13, 1940.

As a result of this invention it will be noted that an improved coal mining machine of the combined cutting, dislodging and loading, longwall type is provided having improved means for cutting the solid coal, dislodging the cut coal from the solid and moving the dislodged coal toward the receiving portion of a conveying means by which the coal is moved away from the coal face to a suitable point of disposal. It will further be evident that by the provision of improved adjusting and elevating means for the cutting and dislodging mechanism the machine is rendered extremely flexible in operation, as well as controllable with comparative ease, even under difficult cutting conditions. It will still further be evident that by the arrangement of the parts in the manner disclosed, the machine is not only relatively flexible in operation, but is also extremely compact and rugged in design, well adapted to meet the demands of service in the mining of coal. Other uses and advantages of the improved mining machine will be clearly apparent to those skilled in the art.

This application is a continuation of my application Serial No. 143,810, filed May 20, 1937.

While there are in this application specifically described one form and a modification which the invention may assume in practice, it will be understood that this form and the modification thereof are shown for purposes of illustration and that the invention may be further modified and embodied in various other forms without departing from its spirit or the scope of the appended claims.

What I claim as new and desire to secure by Letters Patent is:

1. In a machine for advancing a longwall face by simultaneously freeing from the solid, reducing to handleable size and delivering to a desired point outside the face a band of coal of a height such that the machine body may operate on each succeeding cut in the space formed during the preceding traverse along the face, in combination, a narrow elongated body having a base and means for moving it in an endwise direction along a face in a path parallel with the latter, a circulating conveyor supported on said base and extending longitudinally of the latter along the bottom thereof and having an elevated delivery end at the forward end of the machine and a receiving end near the floor level adjacent the rear end of the machine, said conveyor including orbitally movable flights having means near the bottom of said base by which the flights are guided for movement with their outermost limits within the lateral boundaries of said base, and means supported by said body at the rearward end thereof and projecting laterally therefrom at one side of the path of movement of said body for removing a band of coal of substantial depth inside the face of a height at least equal to the overall height of said body, said coal removing means including orbitally circulating cutting and breaking devices and supporting means therefor having means for preventing escape of the loose coal past said devices, said devices having driving means for circulating them in a direction to cause them to move coal freed by them outwardly from beneath the face at the forward side of said coal band removing means into the path of movement of the body toward said conveyor, and said supporting means for said devices guiding them as they emerge from within the coal closely adjacent the receiving end of said conveyor, said conveyor receiving the loose coal removed from the coal band by said coal removing means and conveying the loose coal forwardly lengthwise of said body through the bottom portion of said base, and the elevated delivery end of the conveyor discharging the loose coal into the path of body movement at the forward end of the machine.

2. A machine as defined in claim 1 in which the body includes a frame supported for adjustment into different elevated positions on said base and supporting said coal band removing means, and in which means is provided extending between the base and said frame for elevating the latter relative to said base, said frame elevating means including extensible elevating devices mounted on the bottom of said base within the orbit of circulatory movement of the conveyor flights.

3. In a machine for advancing a longwall face by simultaneously freeing from the solid, reducing to handleable size and delivering to a desired point outside the face a band of coal of a height such that the machine body may operate on each succeeding cut in the space formed during the preceding traverse along the face, in combination, a body having a base and means for moving it along a face, a circulating conveyor supported on said base along the bottom thereof and having an elevated delivery end at the forward end of the machine and a receiving end near the floor level adjacent the rear end of the machine, said conveyor including orbitally movable flights having means near the bottom of said base by which the flights are guided for movement with their outermost limits within the lateral boundaries of said base, means supported by said body at the rearward end thereof for removing a band of coal of a height at least equal to the overall height of said body, said coal removing means including orbitally circulating cutting and breaking devices and supporting means therefor having means for preventing escape of the loose coal past said devices, said devices having driving means for circulating them in a direction to cause them to move coal freed by them outwardly from beneath the face at the forward side of said coal band removing means, and said supporting means for said devices guiding them as they emerge from within the coal closely adjacent the receiving end of said conveyor, said conveyor receiving the loose coal removed from the coal band by said coal removing means and conveying the loose coal forwardly through the bottom portion of said base, and the elevated delivery end of the conveyor discharging the loose coal at the forward end of the machine, said machine body including a frame supported for adjustment into different elevated positions on said base and supporting said coal band removing means, said frame carrying a motor for actuating said coal band removing means and said conveyor, elevating means for positioning and supporting said frame at different elevations above said base, said motor having driving connections on said frame for said band removing means, and extensible driving connections for said conveyor operative in different elevated positions of said frame.

4. A machine as defined in claim 1 in which devices are provided for intercepting coal freed from the coal band and brought out by said coal band removing means and directing such freed coal into the orbit of circulatory movement of said conveyor.

5. In a machine for advancing a longwall face by simultaneously freeing from the solid, reducing to handleable size and delivering to a desired point outside the face a band of coal of a height such that the machine body may operate on each succeeding cut in the space formed during the preceding traverse along the face, in combination, a body having a base and means for moving it along a face, a circulating conveyor supported on said base along the bottom thereof and having an elevated delivery end at the forward end of the machine and a receiving end near the floor level adjacent the rear end of the machine, said conveyor including orbitally movable flights having means near the bottom of said base by which the flights are guided for movement with their outermost limits within the lateral boundaries of said base, means supported by said body at the rearward end thereof for removing a band of coal of a height at least equal to the overall height of said body, said coal removing means including orbitally circulating cutting and breaking devices and supporting means therefor having means for preventing escape of the loose coal past said devices, said devices having driving means for circulating them in a direction to cause them to move coal freed by them outwardly from beneath the face at the forward side of said coal band removing means, and said supporting means for said devices guiding them as they emerge from within the coal closely adjacent the receiving end of said conveyor, said conveyor receiving the loose coal removed from the coal band by said coal removing means and conveying the loose coal forwardly through the bottom portion of said base, and the elevated delivery end of the conveyor discharging the loose coal at the forward end of the machine, said machine body including a frame supported for adjustment into different elevated positions on said base and pivotally supporting said coal band removing means for swinging movement in generally horizontal planes and for tilting about an axis extending longitudinally of the base, said frame carrying a motor, means actuated by said motor to actuate said band removing means, and means actuated by said motor for actuating said conveyor, said conveyor-actuating means including extensible driving connections operatively connected to said conveyor irrespective of the elevated position of said frame.

6. A machine as defined in claim 1, in which the band removing means includes orbitally movable cutter chain carried cutting devices for forming spaced narrow kerfs bounding projections of coal and in which said cutting devices have moving orbitally with them breaking devices effective to exert on each coal projection a breaking action at each side thereof, and in which said cutter chain carried cutting devices have supporting means provided with intermediate walls for precluding escape of freed coal past said band removing means within the space provided by the operation of the latter.

7. A machine as defined in claim 1, in which the body carries a horizontal motor for driving said coal band removing means, said motor having its power shaft extending lengthwise of said body, and in which the outermost lateral limits of the orbit of circulatory movement of the conveyor flights lie within the vertical projection of the sides of said motor.

8. In a machine for advancing a longwall face by simultaneously freeing from the solid, reducing to handleable size and delivering to a desired point outside the face a band of coal of a height such that the machine body may operate on each succeeding cut in the space formed during the preceding traverse along the face, in combination, a body having a base and means for moving it along a face, a circulating conveyor supported on said base along the bottom thereof and having an elevated delivery end at the forward end of the machine and a receiving end near the floor level adjacent the rear end of the machine, said conveyor including orbitally movable flights having means near the bottom of said base by which the flights are guided for movement with their outermost limits within the lateral boundaries of said base, means supported by said body at the rearward end thereof for removing a band of coal of a height at least equal to the overall height of said body, said coal removing means including orbitally circulating cutting and breaking devices and supporting means therefor having means for preventing escape of the loose coal past said devices, said devices having driving means for circulating them in a direction to cause them to move coal freed by them outwardly from beneath the face at the forward side of said coal band removing means, and said supporting means for said devices guiding them as they emerge from within the coal closely adjacent the receiving end of said conveyor, said conveyor receiving the loose coal removed from the coal band by said coal removing means and conveying the loose coal forwardly through the bottom portion of said base, and the elevated delivery end of the conveyor discharging the loose coal at the forward end of the machine, said machine body including a frame supported for adjustment into different elevated positions relative to said base and supporting said coal band removing means, said frame carrying a motor for actuating said coal band removing means and said conveyor, devices for elevating said frame provided with a source of power by said motor, said elevating devices arranged at the bottom of said base within the orbit or circulatory movement of said conveyor, and conveyor driving means also provided with a source of power by said motor including extensible driving connections also extending within the orbit of circulatory movement of said conveyor.

9. A mining and loading machine comprising, in combination, a narrow elongated body having a bottom skid base slidable in an endwise direction over the mine floor along a path parallel to the coal face and an upper frame of substantially the same width as said base mounted on said base for adjustment into different elevated positions with respect thereto, cutting and dislodging mechanism pivotally mounted on said frame at one end thereof to swing horizontally relative to said body into a position projecting laterally from one side of said body, for cutting the coal to a substantial depth inside the coal face and dislodging the cut coal, and a circulating conveyor extending longitudinally through the lower portion of said body between said base and said frame and having its receiving end disposed near the floor level in adjacency to said cutting and dislodging mechanism and its delivery end disposed in an elevated position at the end of said body remote from said cutting and dislodging mechanism, said conveyor having an endless conveying element movable in an orbit with its outermost lateral limits disposed entirely within the lateral limits of said body, said base having extending longitudinally centrally near the bottom thereof guides for said conveying element, said cutting and dislodging mechanism acting on the loose coal to move the same outwardly from beneath the face into the path of movement of said body toward said conveyor, and said conveyor receiving the loose coal dislodged by said cutting and dislodging mechanism and moving the loose coal longitudinally through the lower portion of the body along one side of said base and moving the loose coal into an elevated position at the delivery end of the conveyor to discharge into the path of body movement.

10. A mining and loading machine comprising, in combination, a narrow elongated body having a bottom skid base slidable in an endwise direction over the mine floor along a path parallel to the coal face and an upper frame of substantially the same width as said base mounted on said base for adjustment into different elevated positions with respect thereto, cutting and dislodging mechanism pivotally mounted on said frame at one end thereof to swing horizontally relative to said body into a position projecting laterally from one side of said body, for cutting the coal to substantial depth inside the coal face and dislodging the cut coal, a circulating conveyor extending longitudinally through the lower portion of said body between said base and said frame and having its receiving end disposed near the floor level in adjacency to said cutting and dislodging mechanism and its delivery end disposed in an elevated position at the end of said body remote from said cutting and dislodging mechanism, said conveyor having an endless conveying element movable in an orbit with its outermost lateral limits disposed entirely within the lateral limits of said body, said base having extending longitudinally centrally near the bottom thereof guides for said conveying element, said cutting and dislodging mechanism acting on the loose coal to move the same outwardly from beneath the face into the path of movement of said body toward said conveyor, and said conveyor receiving the loose coal dislodged by said cutting and dislodging mechanism and moving the loose coal longitudinally through the lower portion of the body along one side of said base and moving the loose coal into an elevated position at the delivery end of the conveyor to discharge into the path of body movement, and a motor carried by said adjustable upper frame and extending lengthwise thereof for driving said cutting and dislodging mechanism, said outermost lateral limits of said orbitally movable conveying element being disposed within the vertical projection of the sides of said motor.

11. A mining and loading machine comprising, in combination, a body having a bottom skid base slidable over the mine floor and an upper frame mounted on said base for adjustment into different elevated positions with respect thereto, cutting and dislodging mechanism pivotally mounted on said frame at one end thereof to swing horizontally relative to said body, for cutting and dislodging the coal, a circulating conveyor extending longitudinally through the lower portion of said body between said base and said frame and having its receiving end disposed near the floor level in adjacency to said cutting and dislodging mechanism and its delivery end disposed in an elevated position at the end of said body remote from said cutting and dislodging mechanism, said conveyor having an endless conveying element movable in an orbit with its outermost lateral limits disposed entirely within the lateral limits of said body, said base having extending longitudinally centrally near the bottom thereof guides for said conveying element, and said conveyor receiving the loose coal dislodged by said cutting and dislodging mechanism and moving the loose coal longitudinally through the lower portion of the body along one side of said base and moving the loose coal into an elevated discharge position at the delivery end of the conveyor, a motor carried by said adjustable upper frame, and means driven by said motor for driving said conveyor irrespective of the elevated position of said upper frame, said conveyor driving means including extensible driving connections extending within the orbit of said conveying element below the bottom of said upper frame.

12. A mining and loading machine comprising, in combination, a narrow elongated body having a bottom skid base slidable in an endwise direction over the mine floor along a path parallel to the coal face and an upper frame of substantially the same width as said base mounted on said base for adjustment into different elevated positions with respect thereto, cutting and dislodging mechanism pivotally mounted on said frame at one end thereof to swing horizontally relative to said body into a position projecting laterally from one side of said body, for cutting the coal to a substantial depth inside the coal face and dislodging the cut coal, a circulating conveyor extending longitudinally through the lower portion of said body between said base and said frame and having its receiving end disposed near the floor level in adjacency to said cutting and dislodging mechanism, said conveyor having an endless conveying element movable in an orbit with its outermost lateral limits disposed entirely within the lateral limits of said body, said base having extending longitudinally centrally near the bottom thereof guides for said conveying element, said cutting and dislodging mechanism acting on the loose coal to move the same outwardly from beneath the coal face into the path of the machine body towards said conveyor, and said conveyor receiving the loose coal dislodged by said cutting and dislodging mechanism and moving the loose coal longitudinally through the lower portion of the body along one side of said base and moving the loose coal into an elevated position at the delivery end of the conveyor to discharge into the path of the machine body, and motor operated elevating means for said upper frame including extensible elevating devices mounted on said base within the orbit of said conveying element and spaced longitudinally of said base between the latter and said upper frame.

13. In a mining and loading machine of the longwall type, a narrow elongated body of generally rectangular shape, slidable on its bottom on the floor of a mine and movable in an endwise direction along a longwall coal face in a path in parallelism therewith, said body having a chamber extending longitudinally from end to end through the lower portion thereof, said body comprising a lower base frame and an upper frame of substantially the same width as said base frame, and said chamber being disposed between said frames, cutting and dislodging mechanism pivotally mounted on the upper frame of said body to swing horizontally relative to said body into a position projecting laterally from one side of said body, for cutting the coal in a coal seam to a substantial depth inside the coal face and dislodging the cut coal from the coal seam, a circulating conveyor extending lengthwise of said body through said chamber and having a conveying element movable in an orbit with its opposite runs extending along the opposite sides of said base frame within the lateral limits of said body, said conveyor having its receiving end disposed near the floor level in adjacency to said cutting and dislodging mechanism and its delivery end disposed in an elevated position at the end of said body remote from said cutting and dislodging mechanism, said cutting and dislodging mechanism acting on the loose coal to move the same outwardly from beneath the coal face into the path of the machine body towards said conveyor, and said conveyor receiving the loose coal and moving it longitudinally through said chamber to discharge in the machine path at the delivery end of said conveyor, supporting means on said base frame for supporting said upper frame on said base frame, said supporting means extending within the orbit of said conveying element, and guiding means for said conveying element extending longitudinally along the opposite sides of said supporting means, whereby the conveyor surrounds said supporting means.

14. In a mining and loading machine of the longwall type, a narrow elongated body of generally rectangular shape, slidable on its bottom on the floor of a mine and movable in an endwise direction along a longwall coal face in a path in parallelism therewith, said body having a chamber extending longitudinally from end to end through the lower portion thereof, said body comprising a lower base frame and an upper frame of substantially the same width as said base frame, and said chamber being disposed between said frames, cutting and dislodging mechanism pivotally mounted on the upper frame of said body to swing horizontally relative to said body into a position projecting laterally from one side of said body, for cutting the coal in a coal seam to a substantial depth inside the coal face and dislodging the cut coal from the coal seam, a circulating conveyor extending lengthwise of said body through said chamber and having a conveying element movable in an orbit with its opposite runs extending along the opposite sides of said base frame within the lateral limits of said body, said conveyor having its receiving end disposed near the floor level in adjacency to said cutting and dislodging mechanism and its delivery end disposed in an elevated position at the end of said body remote from said cutting and dislodging mechanism, said cutting and dislodging mechanism acting on the loose coal to move the same outwardly from beneath the coal face into the path of the machine body towards said conveyor, and said conveyor receiving the loose coal and moving it longitudinally through said chamber to discharge in the machine path at the delivery end of said conveyor, supporting means on said base frame for supporting said upper frame on said base frame, said supporting means extending within the orbit of said conveying element, and guiding means for said conveying element extending longitudinally along the opposite sides of said supporting means, whereby the conveyor surrounds said supporting means, said upper frame being adjustable in a vertical direction relative to said base frame to move said cutting and dislodging mechanism into different elevated positions with respect to said conveyor, and said supporting means including elevating devices lying within the orbit of said conveying element for elevating said upper frame.

15. In a mining and loading apparatus, the combination comprising a support movable along a coal face in parallelism therewith and arranged in the relatively narrow space between the coal face and the line of the roof props, conveying means carried by said support and extending longitudinally along the bottom of said support, said conveying means having its receiving end disposed near the level of the mine floor at one end of said support, a frame mounted on said support above said conveying means for adjustment relative thereto into different elevated positions, cutting and dislodging mechanism carried by said adjustable frame for cutting the solid coal and dislodging the cut coal from the solid, said receiving end of said conveying means receiving the coal dislodged by said cutting and dislodging mechanism, means for elevating said frame as aforesaid relative to said support, a motor carried by said adjustable frame for driving said cutting and dislodging mechanism, and means driven by said motor for driving said conveying means, said latter driving means including extensible driving connections for said conveying means operative in the different elevated positions of said frame.

16. In a mining and loading apparatus, the combination comprising a support movable along a coal face in parallelism therewith and arranged in the relatively narrow space between the coal face and the line of the roof props, conveying means carried by said support and extending longitudinally along the bottom of said support, said conveying means having its receiving end disposed near the level of the mine floor at one end of said support, a frame mounted on said support above said conveying means for adjustment relative thereto into different elevated positions, cutting and dislodging mechanism pivotally mounted on said adjustable frame for swinging movement in generally horizontal planes and for tilting about an axis extending longitudinally of said support, said cutting and dislodging mechanism cutting the solid coal and dislodging the cut coal from the solid, said receiving end of said conveying means receiving the coal dislodged by said cutting and dislodging mechanism and means for elevating said frame as aforesaid relative to said support, a motor carried by said adjustable frame for driving said cutting and dislodging mechanism, and means actuated by said motor for actuating said conveying means, said conveying-means-actuating-means including extensible driving connections operatively connected to said conveying means irrespective of the elevated position of said frame.

17. In a mining and loading apparatus, the combination comprising a support movable along a coal face in parallelism therewith and arranged in the relatively narrow space between the coal face and the line of the roof props, conveying means carried by said support and extending longitudinally along the bottom of said support, said conveying means having its receiving end disposed near the level of the mine floor at one end of said support, a frame mounted on said support above said conveying means for adjustment relative thereto into different elevated positions, cutting and dislodging mechanism carried by said adjustable frame for cutting the solid coal and dislodging the cut coal from the solid, said receiving end of said conveying means receiving the coal dislodged by said cutting and dislodging mechanism, means for elevating said frame as aforesaid relative to said support, a motor carried by said adjustable frame for driving said cutting and dislodging mechanism, means provided with a source of power by said motor for actuating said elevating means, and means driven by said motor for driving said conveying means, said latter driving means including extensible driving connections for said conveying means operative in the different elevated positions of said frame.

JOSEPH F. JOY.